(12) United States Patent
Grädener et al.

(10) Patent No.: US 11,148,298 B2
(45) Date of Patent: Oct. 19, 2021

(54) ARRANGEMENT FOR AN ARTICULATED ARM ROBOT AND METHOD FOR DETERMINING THE POSITIONING OF A MOUNT FOR AN END EFFECTOR OF AN ARTICULATED ARM ROBOT

(71) Applicants: Alina Grädener, Berlin (DE); Leo Rokeach, Berlin (DE)

(72) Inventors: Alina Grädener, Berlin (DE); Leo Rokeach, Berlin (DE)

( * ) Notice: Subject to any disclaimer, the term of this patent is extended or adjusted under 35 U.S.C. 154(b) by 107 days.

(21) Appl. No.: 16/629,995

(22) PCT Filed: Jul. 11, 2018

(86) PCT No.: PCT/DE2018/100635
§ 371 (c)(1),
(2) Date: Jan. 10, 2020

(87) PCT Pub. No.: WO2019/011381
PCT Pub. Date: Jan. 17, 2019

(65) Prior Publication Data
US 2020/0139557 A1    May 7, 2020

(30) Foreign Application Priority Data
Jul. 13, 2017 (DE) ........................ 10 2017 115 800.6

(51) Int. Cl.
*B25J 13/08*    (2006.01)
*B25J 9/06*    (2006.01)
(Continued)

(52) U.S. Cl.
CPC .............. *B25J 13/088* (2013.01); *B25J 9/06* (2013.01); *B25J 9/1641* (2013.01); *B25J 18/002* (2013.01)

(58) Field of Classification Search
CPC . B25J 9/06; B25J 9/1641; B25J 13/088; B25J 18/002; B25J 18/00
See application file for complete search history.

(56) References Cited

U.S. PATENT DOCUMENTS 4,606,696 A * 8/1986 Slocum .................... B25J 9/046
33/1 PT
2004/0073335 A1   4/2004 Gong

FOREIGN PATENT DOCUMENTS

| BE | 1000768 A4 | 3/1989 |
| DE | 4314597 A1 | 11/1994 |
| EP | 2732934 A2 | 5/2014 |

OTHER PUBLICATIONS

International Search Report dated Oct. 5, 2018 for PCT/DE2018/100635.

\* cited by examiner

*Primary Examiner* — Dale Moyer
(74) *Attorney, Agent, or Firm* — Schmeiser, Olsen & Watts, LLP

(57) ABSTRACT

An arrangement for an articulated arm robot having an articulated arm and having a measurement arm formed in a parallel kinematic system is provided. The articulated arm includes: joints, each of which has a joint axis; actuators, each actuator being associated with one of the joints; link elements, which connect the joints in a serial articulated arm arrangement; and a mount for an end effector, which mount is arranged at an end of the articulated arm and is configured to hold an end effector. The measurement arm includes: measurement arm joints, each of which has a measurement arm joint axis, which extends coaxially to the joint axis of an associated joint of the articulated arm; rotary encoders, each encoder being associated with one of the measurement arm joints; and measurement arm link elements, which (Continued)

connect the measurement arm joints in a serial measurement arm arrangement.

9 Claims, 1 Drawing Sheet

(51) Int. Cl.
  *B25J 9/16* (2006.01)
  *B25J 18/00* (2006.01)

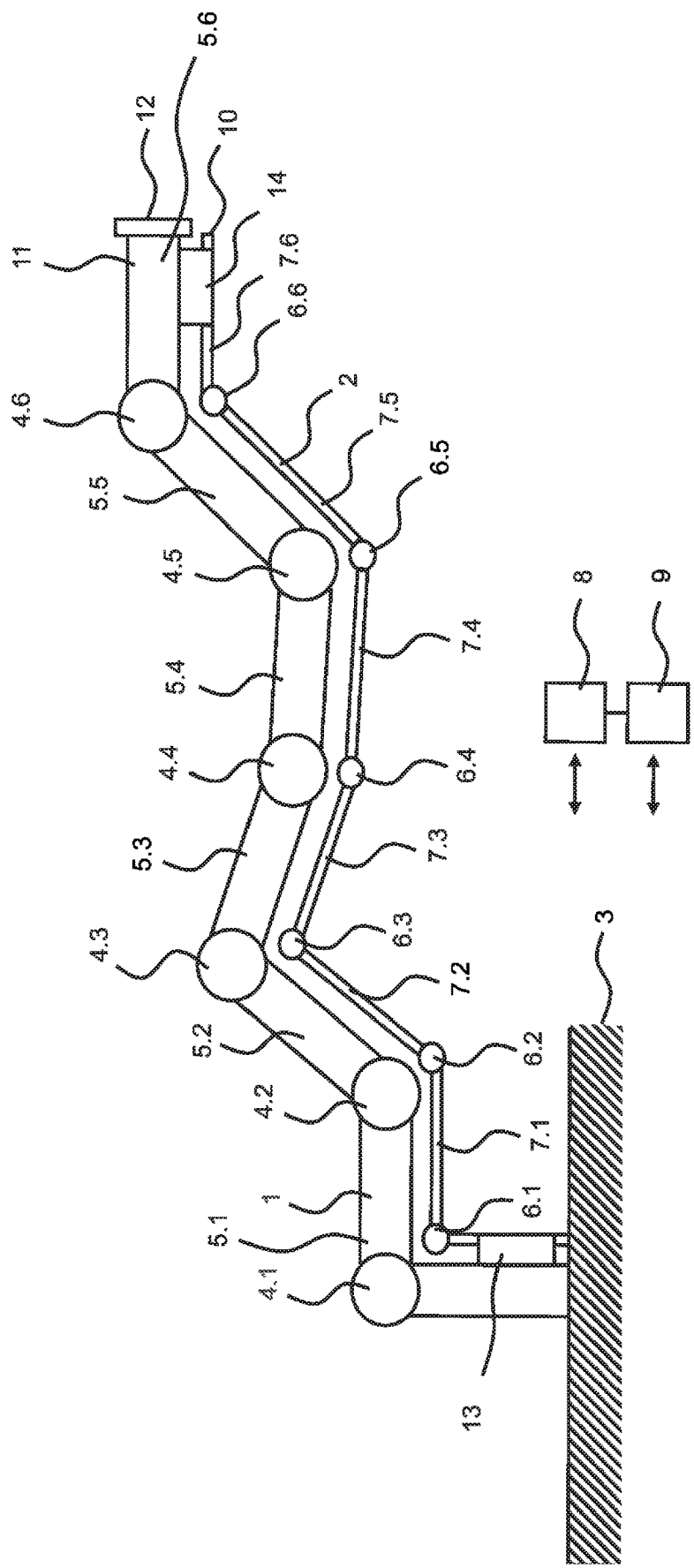

ARRANGEMENT FOR AN ARTICULATED ARM ROBOT AND METHOD FOR DETERMINING THE POSITIONING OF A MOUNT FOR AN END EFFECTOR OF AN ARTICULATED ARM ROBOT

CROSS-REFERENCE TO RELATED APPLICATIONS

This application claims priority to PCT Application No. PCT/DE2018/100635, having a filing date of Jul. 11, 2018, based on German Application No. 10 2017 115 800.6, having a filing date of Jul. 13, 2017, the entire contents both of which are hereby incorporated by reference.

FIELD OF TECHNOLOGY

The following relates to an articulated arm robot and a method for determining the positioning of a mount for an end effector of an articulated arm robot.

BACKGROUND

Articulated arm robots, which are referred to also as joint arm robots, are three-dimensionally movable industrial robots, the kinematics of which is constructed from several arm links connected to each other in an articulated manner in order to guide an end effector such as grippers or tools. Articulated arm robots permit high mobility. Vertical articulated arm robots are based on a serial kinematics, in which each arm link (link element) is connected to only one further arm link. Parallel-kinematic articulated arm robots comprise a kinematics comprising several axes arranged in parallel, which are connected in an articulated manner to a gripper platform.

Industrial articulated arm robots typically consist of joints with actuators, usually servomotors, and arm links connecting the same. The number of joints is expressed as the number of possible degrees of freedom (DOF) or the number of axes. Normally articulated arm robots have six or five axes. Due to their serial setup articulated arm robots can be flexibly used. However, in comparison to parallel kinematics they have to be constructed in a very stiff manner. Moreover, the first actuator must support all subsequent actuators, the second one must support the ones following it etc. This implies a construction with a great deal of mass in order to achieve sufficient stiffness. The positional accuracy and accuracy of orientation of the end effector is determined via the position sensors of the actuators. This means that deformation in the arm links and joints cannot be taken into consideration by the control of the actuators. Thermal and mechanical loads in particular have a considerable influence on the positional accuracy.

SUMMARY

An aspect relates to an arrangement for an articulated arm robot and a method for determining the positioning of a mount for an end effector of an articulated arm robot, which make it possible to improve positioning of the mount for the end effector as well as of the end effector.

According to one aspect an arrangement for an articulated arm robot is provided. The arrangement comprises an articulated arm. The articulated arm robot is formed with joints, each of which comprises a joint axis, actuators assigned each to one of the joints, link elements which connect the joint in a serial articulated arm arrangement and a mount for an end effector which is arranged at one end of the articulated arm and arranged to hold an end effector. The arrangement additionally comprises a measurement arm. The measurement arm is formed with measurement arm joints, each of which comprises a measurement arm joint axis, which extends coaxially to the joint axis of an associated joint of the articulated arm, rotary encoders, which are each associated with one of the measurement arm joints, and measurement arm link elements, which connect the measurement arm joints in a serial measurement arm arrangement. The articulated arm and the measurement arm form a parallel arm structure, in which one end of the measurement arm is connected to the end of the articulated arm and an opposite end of the measurement arm is connected to an opposite end of the articulated arm. The arrangement comprises a control device, which is configured to control the actuators of the joints for moving the articulated arms. Furthermore the arrangement comprises a measurement device which is configured to determine a position and/or orientation of the end of the measurement arm and thus to determine a position and/or orientation of the end of the articulated arm having the mount of the end effector, taking into account measurement signals of the rotary encoders of the measurement arm joints.

According to a further aspect a method is provided for determining a positioning of a mount for an end effector of an articulated arm robot. The articulated arm robot comprises an articulated arm. The articulated arm is formed with joints each comprising an axis, actuators associated each with one of the joints, link elements connecting the joints in a serial articulated arm arrangement, and a mount for an end effector arranged at one end of the articulated arm and arranged to hold an end effector. The articulated arm robot comprises a measurement arm. The measurement arm is formed with measurement arm joints, each of which comprises a measurement arm joint axis, which extends coaxially to the joint axis of an associated joint of the articulated arm, rotary encoders associated each with one of the measurement joints, and measurement arm link elements, which connect the measurement arm joints in a serial measurement arm arrangement. The method comprises the following steps: forming a parallel kinematics for the articulated arm and the measurement arm, in which one end of the measurement arm is connected to the end of the articulated arm and the opposite end of the measurement arm is connected to an opposite end of the articulated arm, moving the articulated arm by means of controlling the actuators of the joints with a control device, wherein the measurement arm is moved simultaneously in parallel, recording measurement signals for the rotary encoders of the measurement arm joints by means of a measurement device, and determining a position and/or orientation of the end of the measurement arm and thus a position and/or orientation of the end of the articulated arm having the mount of the end effector, taking into account the measurement signals by means of the measurement device.

A parallel arrangement of the articulated arm and measurement is provided. If the articulated arm is moved by means of controlling the actuators of the joints, the measurement arm is forced to perform the same movement. Position and/or orientation of the end of the measurement arm can be determined by way of the measurement signals received by the rotary encoders in the measurement arm joints. This can then be used for determining the position and/or orientation of the end of the articulated arm having the mount of the end effector. If an end effector is assembled in the mount at the end of the articulated arm, position and/or orientation determination of the end effector is made possible.

With the proposed technology the articulated arm can be configured and optimized as regards its construction without having to take into account a measurement system for position and/or orientation determination. Position and/or orientation determination is effected with the aid of the measurement arm and the associated measurement device, which evaluates the measurement signals of the encoders in the measurement arm joints. There are therefore no restrictions or obstacles, which result from having to take into consideration a measurement system for position determination at the articulated arm.

If position and orientation are determined, this is also called determination of the pose.

The arrangement can be used to construct a vertical articulated arm robot. Alternatively, the arrangement having the parallel arm structure with articulated arm and measurement arm can also be used for a non-vertical articulated arm robot, for example an articulated arm robot, which is mounted to an upright standing wall.

The actuators of the joints may each be formed free of a rotary encoder. Since the measurement signals used for position determination are issued by the rotary encoders in the measurement arm joints, there is no need for rotary encoders in the joints of the articulated arm. The joints of the articulated arm can thus be configured in a simplified manner. In particular a reduction in weight can be achieved. Also, in technical terms the joints may be constructed less complex.

Alternatively, the actuators of the joints may each comprise a rotary encoder. For example, the actuators may be configured with a servomotor. The encoders in the joints of the articulated arm provide additional measurement signals, thereby allowing position determination to be selectively optimized. The rotary encoders in the joints of the articulated arm may couple to the measurement device, so that the measurement device receives measurement signals of the rotary encoders of the joints. In one embodiment it may be provided that the measurement signals of the rotary encoders are evaluated in the joints of the articulated arm, in order to respectively determine a load occurring on the actuators and/or a load occurring on the mount/the end effector, taking into account a stiffness of the articulated arm. For example, the stiffness in the articulated arm may be idealized by means of torsional stiffness in the joints. Deformation behavior on the end effector can then be determined using a suitable principle, for example the principle of virtual forces. A deformation angle in the joints then serves as an input value. The deformation angle is the angle difference between the angles of the rotary encoder of the measurement arm joint and the rotary encoder of the associated joint of the articulated arm.

All measurement arm links not at the end of the measurement arm may be formed free of a connection with link elements not at the end of the articulated arm. Whilst the measurement arm links at the end of the measurement arm as well as the link elements (arm links) at the end of the articulated arm are connected with each other, there exists no such connection between the measurement arm links and link elements, which are not at the end.

One or more of the measurement arm links and link elements not at the end of the measurement arm and link elements not at the end of the articulated arm may be associated with a connection device, which is configured to form a releasable pair-wise connection for the not-end-side measurement arm links and link elements. With the aid of the connection device measurement arm links of the measurement arm and link elements of the articulated arm associated with each other and not arranged at the end in the respective serial arrangement, can be temporarily connected to each other, when the arrangement for the articulated arm robot is in operation. This means that the releasable connection can exist in one movement section, whereas in a subsequent movement section the connection is again released. In this way it can be ensured that the measurement arm follows the movement of the articulated arm even in singular positions of the joints of the articulated arm, even if because of such a singular position there is a certain probability that this could not be the case. With the aid of the connection device this probability for not following the movement is overcome. It is ensured that in each position of the joints the measurement arm follows the movement of the articulated arm. The connection device may for example be arranged to implement the releasable connection as a clamping connection.

The releasable connection may be activatable and de-activatable by means of associated control signals and/or manually, so that the connection is formed or released due to the activation/deactivation. In the case of manual activation the releasable connection is established manually in order to release it again later, e.g. then, when for a subsequent movement of the arrangement for the articulated arm robot there is no probability that the measurement arm would not follow the movement of the articulated arm for this movement. The associated control signals for activating and for deactivating may be generated for example depending on angle positions of one or more of the measurement arm links. The respective angle position of one or more of the measurement arm links can be utilized in order to activate or deactivate, i.e. to close or to open, the releasable connection. Alternatively, or additionally measurement signals for joint positions of the joints of the articulated arm may be utilized for determining a position, which triggers activation of the releasable connection.

The link elements of the articulated arm may comprise an element housing, and the measurement arm may be arranged at least in sections, in one or more of the element housings. With this embodiment measurement arm link elements of the measurement arm are arranged in the element housing.

The articulated arm and the measurement arm may each comprise at least five rotary axes, which are provided by the joints and the measurement arm joints. In one embodiment the articulated arm and the measurement arm have six or more joints with associated rotary axes.

The measurement arm link elements can be rods consisting of a fiber-reinforced material. It is for example possible to use carbon-fiber-reinforced materials.

The previously discussed alternative designs can be provided in an appropriate manner in conjunction with the method for determining positioning of a mount for the end effector of an articulated arm robot.

With the method the determined position of the end of the articulated arm having the mount of the end effector can be compared with a set position. The articulated arm may be moved additionally if the determined position deviates from the set position. In this way a re-adjustment of the end of the articulated arm having the mount of the end effector is made possible starting from the positioning determined for the measurement arm. A control mechanism may be utilized in order bring the end of the articulated arm having the mount for the end effector into the set or target position. An admissible deviation may be defined for the deviation between set position and currently determined position.

With the method it may be provided that a connection device is activated for one or more measurement arm links not at the end of the measurement arm and link elements not at the end of the articulated arm, if a singular arm position is determined for the articulated arm and/or the measurement arm, which is determined by predefined positions for one or more joints/measurement arm joints, wherein when the connection device is activated, one or more releasable connections are formed pair-wise between the not-end-side measurement arm links and the not-end-side link elements. During the course of a movement of the articulated arm robot which comprises a number of movement sections or movement elements, the releasable connection may be activated for individual or several movement sections, whereas the connection in other movement sections is released. Releasing or connecting may be performed in dependence of currently measured joint positions for the measurement arm joints and/or the joints of the articulated arm.

With the method the end effector can be moved or guided manually during operation, for example for so-called teaching purposes. Measured values for the manual movement may be measured by means of a multi-axis load sensor, for example by means of a six-axis load sensor. The measured values or parameters derived therefrom can be compared to associated measured values, which are recorded my means of the measurement arm. In case of an inadmissible deviation of the compared measured values of the multi-axis load sensor and measurement arm a warning signal or emergency signal may be issued, which may ultimately lead to blocking further operation of the articulated arm robot. An inadmissible deviation may be present if the compared measured values deviate from each other beyond predetermined limits.

BRIEF DESCRIPTION

Some of the embodiments will be described in detail, with references to the following FIGURES, wherein like designations denote like members, wherein:

FIG. 1 shows a schematic view of an arrangement for an articulated arm robot according to embodiments of the invention.

DETAILED DESCRIPTION

FIG. 1 shows a schematic view of an arrangement for an articulated arm robot having an articulated arm 1 and a measurement arm 2 configured in parallel thereto. The articulated arm 1 and the measurement arm 2 form a parallel kinematics (parallel arm structures) in such a way that the measurement arm 2 is forced to follow the arm movement performed by the articulated arm 1.

The articulated arm is mounted on a platform 3 and comprises joints 4.1, 4.2, 4.3, 4.4, 4.5 and 4.6, which are serially connected to each other via the link elements 5.1, 5.2, 5.3, 5.4, 5.5, and 5.6. The FIGURE shows a simplified view. In deviation therefrom one or more of the link elements 5.1, 5.2, 5.3, 5.4, 5.5, and 5.6 may be pointing into the drawing plane at different angles, such as this is known for articulated arm robots.

The measurement arm 2 comprises measurement joints 6.1, 6.2, 6.3, 6.4, 6.5, and 6.6 as well as measurement arm link elements 7.1, 7.2, 7.3, 7.4, 7.5, and 7.6 connecting the same in a serial manner. Rotary axes of the measurement arm joints 6.1, to 6.6 are arranged coaxially to the rotary axes of the joints 4.1, to 4.6. End-side link elements 5.1, 5.6 and end-side measurement arm link elements 7.1, 7.6 are pair-wise firmly connected with each other.

If actuators in the joints 4.1 to 4.6 of the articulated arm 1 are controlled with the aid of a control device 8 in order to move the articulated arm 1, the measurement arm 2 is forced to perform this movement as well.

The measurement arm joints 6.1 to 6.6 each comprise a rotary encoder, which couples to a measurement device 9. The measurement device 9 can determine the position and/or the orientation of one end 10 of the measurement arm 2 by way of the measurement signals of the rotary encoders from the measurement arm joints 6.1 to 6.6. This can be used to determine the position and/or orientation of one end 11 of the articulated arm 1, on which a mount 12 for an end effector (not shown), for example a gripper or a tool, is arranged. Thus the position determination, with the aid of the measurement arm, makes it possible to determine the position and/or the orientation of the mount 12 for the end effector, i.e. ultimately to determine the position and/or orientation for an end effector, which is mounted on the mount 12, such as a gripper.

Connections 13, 14 are provided for the pair-wise connection of the end-side link elements 5.1, 5.6 and the end-side measurement arm link elements 7.1, 7.6, for example in the form of a fixed mechanical connection, which may be selectively releasable.

The measurement arm link elements 7.1 to 7.6 may for example be implemented as rods manufactured for example from a fiber-reinforced material.

The actuators of the joints may be formed with the aid of servomotors, with which the drive means can be controlled. The name servomotor in particular refers to electric motors, which permit control of the angle position of its motor shaft and optionally of the rotary speed and/or the acceleration. They comprise, or consist of, an electric motor, which is additionally equipped with a sensor for position determination. The rotary position of the motor shaft ascertained by the sensor can be continuously transmitted to a control electronics outside the actual motor, the so-called servo controller, which can control the motion of the motor in a control circuit based on one or more adjustable set (required) values such as the set angle position of the shaft or the set speed.

In order to avoid the influence of deformation of the link elements 5.1 to 5.6 and the actuators on the positional accuracy of the articulated arm 1, it is proposed to decouple the measuring of the position and orientation of the end effector from the actuators of the articulated arm 1. For this purpose, the measurement system with the measurement arm 2 may be provided with high-solution rotary encoders in the measurement arm joints 6.1 to 6.6 parallel to the articulated arm 1. Physical contact is envisaged for the respectively first and last link element in the chain of the articulated arm 1 and the measurement arm 2.

Alternatively, it is possible to integrate merely parts of the actuators/joint chain in the above-mentioned drive chain of the articulated arm 1. The axes of the measurement arm joints 6.1 to 6.6 coincide with the axes of the joints 4.1 to 4.6 of the actuators (both rotary axes are coaxial). In this case there is no need for rotary encoders of servomotors of the joints 4.1 to 4.6. Control of the end effector position is performed with the aid of the angular rotary encoders in the measurement arm joints 6.1 to 6.6.

Given the special case of singular positions of individual joints it might happen without taking special precautions that the respective measurement arm does not follow the actuator chain. For this purpose, a clamping mechanism is provided, which has a fixed connection of the respective joint with the actuator joint only for these positions. Activation of this clamping mechanism can be in a mechanical manner or by external activation.

The rotary axes of the measurement system with the measurement arm 2 may be, in terms of manufacturing accuracy and deformation accuracy, coaxial to the respective axes of the robot.

Usually, the system is applied to a six-axis articulated arm robot. In this case the measurement system is connected to the fixed link (frame) and the end effector. Since in total a six-axis motion of the measurement system is performed, the measurement system must be attached in all six axes to the end effector (fixed clamping). A five-axis robot is also feasible. In this case it would be necessary, in order to avoid any constraints in the measurement system, to fixedly attach only five axes to the end effector; the rotary axis in the place, where there would normally be the sixth axis, would have to be freely rotatable. The measurement system with the measurement arm 2 then also comprises only five angular rotary encoders.

Alternatively, all six degrees of freedom of the measurement system can be held on the end effector and only five axes can be held be held at the beginning of the measurement system. In this case the degree of freedom of the first axis (vertical rotary axis) should be kept free.

It may be provided to use the measurement system with the measurement arm 2 only for a limited number of rotary axes. The measurement system could for example be arranged at the measurement arm link 7.1 between axis 1 and 2 (in the measurement arm joints 6.1, 6.2) and at the measurement arm link 7.5. In this case the measurement system would have four rotary encoders, and the end of the measurement arm 2 would have to release two degrees of freedom (4+2=6), in order to maintain an unequivocal orientation and to prevent any constraints from developing in the measurement system with the measurement arm 2.

Also, robots with more than six axes, as they are used for example in weightless space, may be equipped with such a measurement system. The measurement system with the measurement arm 2 then has not more than six degrees of freedom. It would in this case span only six axes. Alternatively, the measurement system with the measurement arm 2 could have more than six rotary encoders and a number of rotary encoders, which are more than six, can be guided by the articulated arm 1 with one degree of freedom.

The positional accuracy is not affected by the stiffness of the drive chain of the articulated arm 1. The stiffness and thus the mass of the drive chain can be reduced. Due to the lesser mass of the articulated arm 1 the danger of injury is less. Thus, a robot with the articulated arm 1 and the measurement arm 2 is rather more suited as a robot collaborating with humans. Due to the smaller mass the actuators can also be of a weaker design, which leads to a reduction in price.

Since with the articulated arm 1 the position of the actuator does not need to be determined via the rotary encoder of the actuator, a servo actuator, for example a servomotor, can be waived. It is possible to use normal drives without angle transmitters.

Due to the higher positional accuracy a robot equipped with such articulated arm 1 and measurement arm 2 is also suitable as a machine tool, for example a milling machine tool.

If, however an angle transmitter is still integrated into the actuators of the articulated arm 2, the load occurring on individual actuators and also the load occurring on the end effector can be calculated via the difference in the set position/actual position and the stiffness of the machine. With collaborating robots an excessively high load can be ascertained, and the machine can be switched off in reaction thereto. A danger to injury can thus be reduced.

Working loads such as cutting loads can be utilized in manufacture for optimizing tool use.

If the end effector is moved manually for so-called teaching purposes, values can be measured for the manual motion by means of a multi-axis load sensor, for example a six-axis load sensor. The measured values or parameters derived therefrom can be compared to measured values, which are recorded by means of the measurement arm. In the case of an inadmissible deviation of the compared measured values of multi-axis load sensor and measurement arm a warning or emergency signal can be issued, which may ultimately lead to blocking any further operation of the articulated arm robot.

This can be implemented with this development for online programming (alternatively to a multi-axis load sensor).

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. An arrangement for an articulated arm robot, comprising:
    an articulated arm, with
        one or more joints, each of which comprises a joint axis;
        one or more actuators, each of which are associated with one of the joints;
        one or more link elements, which connect the joints in a serial articulated arm arrangement; and
        a mount for an end effector, which is arranged at one end of the articulated arm and configured to hold an end effector;
    a measurement arm, with
        one or more measurement arm joints, each of which comprises a measurement arm joint axis extending coaxially to the joint axis of an associated joint of the articulated arm;
        one or more rotary encoders, which are each associated with one of the measurement arm joints; and
        one or more measurement arm link elements, which connect the measurement arm joints in a serial measurement arm arrangement;
    wherein the articulated arm and the measurement arm form a parallel kinematics, in which the end of the articulated arm is connected to an end of the measurement arm and an opposite end of the articulated arm is connected to an opposite end of the measurement arm;
    a control device, which is configured to control the actuators of the joints for moving the articulated arm; and
    a measurement device, which is configured, taking into account measurement signals of the rotary encoders of the measurement arm joints, to determine a position and/or orientation of the end of the measurement arm and thus a position and/or orientation of the end of the articulated arm having the mount of the end effector;

wherein one or more of the not-end-side measurement arm links of the measurement arm and of the not-end-side link elements of the articulated arm have a connection device associated with them, which is configured to form a releasable pair-wise connection for the not-end-side measurement arm links and for the not-end-side link elements; and wherein the releasable connection can be activated or deactivated by means of associated control signals and/or manually, so that the connection is formed or released due to the activation/deactivation.

2. The arrangement according to claim 1, wherein the one or more actuators of the joints are each formed free of a rotary encoder.

3. The arrangement according to claim 1, wherein the one or more actuators of the joints each comprise a rotary encoder.

4. The arrangement according to claim 1, wherein all measurement arm links not at the end of the measurement arm are formed free of a connection with link elements not at the end of the articulated arm.

5. The arrangement according to claim 1, wherein the one or more link elements of the articulated arm comprise an element housing and the measurement arm is arranged, at least in sections, in one or more of the element housings.

6. The arrangement according to claim 1, wherein the articulated arm and the measurement arm each comprise at least five rotary axes, which are provided by the joints and the measurement arm joints.

7. The arrangement according to claim 1, wherein the measurement arm link elements are in the form of rods produced from a fiber-reinforced material.

8. A method for determining a positioning of a mount for an end effector of an articulated arm robot, the articulated arm robot comprising,
   an articulated arm with:
      one or more joints, which each comprise a joint axis;
      one or more actuators, which are each associated with one of the joints;
      one or more link elements, which connect the joints in a serial articulated arm arrangement; and
      a mount for an end effector, which is arranged at one end of the articulated arm and configured to hold an end effector; and
   a measurement arm with:
      one or more measurement arm joints, which each comprise a measurement arm joint axis extending coaxially to the joint axis of an associated joint of the articulated arm;
      one or more rotary encoders, which are each associated with one of the measurement arm joints; and
      one or more measurement arm link elements, which connect the measurement arm joints in a serial measurement arm arrangement;
   wherein the method comprises the following steps:
      forming a parallel kinematics for articulated arm and measurement arm, in which one end of the measurement arm is connected to the end of the articulated arm and an opposite end of the measurement arm is connected to an opposite end of the articulated arm;
      moving the articulated arm by means of controlling the actuators of the joints with the aid of a control device, wherein the measurement arm is moved in parallel thereto at the same time; and
      recording measurement signals for the rotary encoders of the measurement arm joints with the aid of a measurement device; and
      determining a position and/or orientation of the end of the measurement arm and thus a position and/or orientation of the end of the articulated arm having the mount of the end effector taking into account the measurement signals by means of the measurement device; wherein a connection device is activated for one or more not-end-side measurement arm links of the measurement arm as well as not-end-side link elements of the articulated arm, if a singular arm position is determined for the articulated arm and/or the measurement arm, which is determined by predefined positions for one or more of the joints/measurement arm joints, wherein during activation of the connection device one or more releasable connections are formed pair-wise between the not-end-side measurement arm links and the not-end-side link elements.

9. The method according to claim 8, wherein the determined position of the end of the articulated arm having the mount of the end effector is compared to a set position and the articulated arm is additionally moved if the determined position deviates from the set position.

* * * * *